(12) United States Patent
Le Neel et al.

(10) Patent No.: US 9,618,653 B2
(45) Date of Patent: Apr. 11, 2017

(54) MICROELECTRONIC ENVIRONMENTAL SENSING MODULE

(71) Applicant: STMicroelectronics Pte Ltd., Singapore (SG)

(72) Inventors: Olivier Le Neel, Singapore (SG); Ravi Shankar, Singapore (SG); Suman Cherian, Singapore (SG)

(73) Assignee: STMicroelectronics Pte Ltd., Singapore (SG)

( * ) Notice: Subject to any disclaimer, the term of this patent is extended or adjusted under 35 U.S.C. 154(b) by 855 days.

(21) Appl. No.: 13/853,801

(22) Filed: Mar. 29, 2013

(65) Prior Publication Data

US 2014/0294046 A1 Oct. 2, 2014

(51) Int. Cl.
*G01K 7/01* (2006.01)
*G01K 7/34* (2006.01)
(Continued)

(52) U.S. Cl.
CPC .............. *G01W 1/02* (2013.01); *G01P 5/14* (2013.01); *G01F 1/44* (2013.01)

(58) Field of Classification Search
CPC . G01F 1/44; G01K 13/02; G01K 1/14; G01K 7/01; G01K 7/34
(Continued)

(56) References Cited

U.S. PATENT DOCUMENTS 4,608,232 A * 8/1986 Sunano ............... G01N 27/4073
324/717

4,938,053 A * 7/1990 Jepson ..................... G01F 1/28
73/196

(Continued)

FOREIGN PATENT DOCUMENTS

CN 201307027 Y * 9/2009
CN 102680016 A * 9/2012
(Continued)

OTHER PUBLICATIONS

Wilson et al.,"APTI Course 435 Atmospheric Sampling Student Manual: ," United States Environmental Protection Agency, Air Pollution Training Institute, Research Triangle Park, N.C., Chapter 3, Air measuring instruments, pp. 3-1 to 3-56, Sep. 1980, 61 Pages.
(Continued)

*Primary Examiner* — Gail Kaplan Verbitsky
(74) *Attorney, Agent, or Firm* — Seed Intellectual Property Law Group LLP (57) ABSTRACT

Sensors for air flow, temperature, pressure, and humidity are integrated onto a single semiconductor die within a miniaturized Venturi chamber to provide a microelectronic semiconductor-based environmental multi-sensor module that includes an air flow meter. One or more such multi-sensor modules can be used as building blocks in dedicated application-specific integrated circuits (ASICs) for use in environmental control appliances that rely on measurements of air flow. Furthermore, the sensor module can be built on top of existing circuitry that can be used to process signals from the sensors. By integrating the Venturi chamber with accompanying environmental sensors, correction factors can be obtained and applied to compensate for temporal humidity fluctuations and spatial temperature variation using the Venturi apparatus.

7 Claims, 12 Drawing Sheets

(51) Int. Cl.
*G01W 1/02* (2006.01)
*G01P 5/14* (2006.01)
*G01F 1/44* (2006.01)

(58) Field of Classification Search
USPC ........ 374/100, 109, 110, 111, 112, 114, 185,
374/170, 163, 137, 138, 141, 142, 143,
374/147–148; 73/23.24, 23.25, 23.26,
73/23.27, 29.01, 29.02, 29.03, 861.63
See application file for complete search history.

(56) References Cited

U.S. PATENT DOCUMENTS

| | | | |
|---|---|---|---|
| 5,834,777 A * | 11/1998 | Wong | G01N 21/0303 |
| | | | 250/338.4 |
| 6,243,474 B1 | 6/2001 | Tai et al. | |
| 6,322,247 B1 * | 11/2001 | Bonne | G01F 1/6842 |
| | | | 374/138 |
| 6,352,874 B1 | 3/2002 | McNeil et al. | |
| 6,361,206 B1 * | 3/2002 | Bonne | G01F 1/6842 |
| | | | 374/135 |
| 6,383,832 B1 | 5/2002 | Nakabayashi | |
| 6,478,974 B1 | 11/2002 | Lebouitz et al. | |
| 6,546,812 B2 * | 4/2003 | Lewis | G01F 1/363 |
| | | | 73/861.63 |
| 6,698,297 B2 * | 3/2004 | Gysling | G01F 1/74 |
| | | | 73/861.63 |
| 6,879,089 B2 | 4/2005 | Wong et al. | |
| 7,280,436 B2 | 10/2007 | Pedersen | |
| 7,437,951 B2 * | 10/2008 | McDonald | A61M 5/16886 |
| | | | 73/861.52 |
| 7,556,895 B2 | 7/2009 | Moriya et al. | |
| 7,703,339 B2 * | 4/2010 | Sulouff, Jr. | G01F 1/36 |
| | | | 73/861.85 |
| 7,821,085 B2 | 10/2010 | Suzuki et al. | |
| 7,864,403 B2 | 1/2011 | Bita et al. | |
| 7,880,315 B2 | 2/2011 | Beyne et al. | |
| 7,946,505 B2 * | 5/2011 | Lynam | B60H 1/00785 |
| | | | 165/202 |
| 8,062,497 B2 | 11/2011 | Witvrouw et al. | |
| 8,258,017 B2 | 9/2012 | Masuko et al. | |
| 8,390,121 B2 | 3/2013 | Okumura et al. | |
| 8,487,387 B2 | 7/2013 | Lin et al. | |
| 8,696,989 B2 * | 4/2014 | Esfandyarpour | G01N 25/4806 |
| | | | 374/10 |
| 8,715,514 B2 | 5/2014 | Lee et al. | |
| 8,806,933 B2 * | 8/2014 | Kohno | G01F 1/6842 |
| | | | 73/204.15 |
| 8,852,513 B1 * | 10/2014 | Speer | H01L 23/055 |
| | | | 204/424 |
| 9,105,479 B2 * | 8/2015 | Besling | H01L 21/77 |
| 9,164,052 B1 * | 10/2015 | Speer | G01N 27/22 |
| 9,317,155 B2 * | 4/2016 | Magi | G06F 3/0414 |
| 2002/0160611 A1 | 10/2002 | Horsley | |
| 2002/0166376 A1 * | 11/2002 | Kohmura | G01F 5/00 |
| | | | 73/204.26 |
| 2003/0079542 A1 * | 5/2003 | Bonne | G01F 1/40 |
| | | | 73/432.1 |
| 2005/0109081 A1 * | 5/2005 | Zribi | B82Y 15/00 |
| | | | 73/31.05 |
| 2006/0162466 A1 * | 7/2006 | Wargo | G01F 1/363 |
| | | | 73/861.63 |
| 2008/0163687 A1 * | 7/2008 | Kranz | B81C 1/00246 |
| | | | 73/514.32 |
| 2008/0194053 A1 | 8/2008 | Huang | |
| 2008/0308920 A1 | 12/2008 | Wan | |
| 2008/0315332 A1 | 12/2008 | Kaelberer et al. | |
| 2009/0218702 A1 | 9/2009 | Beyne et al. | |
| 2010/0173437 A1 | 7/2010 | Wygant et al. | |
| 2010/0314740 A1 | 12/2010 | Choi et al. | |
| 2011/0031565 A1 | 2/2011 | Marx et al. | |
| 2011/0045639 A1 | 2/2011 | Masuko et al. | |
| 2011/0108932 A1 | 5/2011 | Benzel et al. | |
| 2011/0150261 A1 | 6/2011 | Ho et al. | |
| 2011/0298134 A1 | 12/2011 | Williams et al. | |
| 2012/0024054 A1 * | 2/2012 | Huang | G01F 1/6845 |
| | | | 73/204.26 |
| 2012/0032283 A1 | 2/2012 | Frey et al. | |
| 2012/0167392 A1 | 7/2012 | Cherian et al. | |
| 2012/0168882 A1 | 7/2012 | Cherian et al. | |
| 2012/0171713 A1 | 7/2012 | Cherian et al. | |
| 2012/0171774 A1 | 7/2012 | Cherian et al. | |
| 2012/0299127 A1 | 11/2012 | Fujii et al. | |
| 2013/0010826 A1 | 1/2013 | Le Neel et al. | |
| 2013/0036806 A1 * | 2/2013 | Kohno | G01F 1/684 |
| | | | 73/114.33 |
| 2013/0139587 A1 | 6/2013 | Le Neel et al. | |
| 2013/0334620 A1 | 12/2013 | Chu et al. | |
| 2014/0197500 A1 * | 7/2014 | Guillemet | G01N 27/227 |
| | | | 257/414 |
| 2014/0264655 A1 | 9/2014 | Williams et al. | |
| 2014/0264744 A1 | 9/2014 | Chi et al. | |
| 2014/0268523 A1 | 9/2014 | Gogoi | |
| 2014/0311905 A1 * | 10/2014 | Stetter | B01J 31/06 |
| | | | 204/424 |

FOREIGN PATENT DOCUMENTS

| | | | |
|---|---|---|---|
| CN | 102680018 A | * | 9/2012 |
| CN | 101788315 B | * | 11/2012 |
| CN | 202770456 U | * | 3/2013 |
| TW | 200531224 A | | 9/2005 |

OTHER PUBLICATIONS

J.M Lim, B.H. Yoon, Y.K Oh, Kyung-Am Park, "The humidity effect on air flow rates in a critical flow venturi nozzle," Flow Measurement and Instrumentation, 22:402-405, Jun. 4, 2011, 4 Pages.

Le Neel et al., "Durable Minature Gas Composition Detector Having Fast Response Time," U.S. Appl. No. 13/853,805, filed Mar. 29, 2013, 36 Pages.

Le Neel et al., "Integrated Multi-Sensor Module," U.S. Appl. No. 13/853,732, filed Mar. 29, 2013, 37 Pages.

Le Neel et al., "Adhesive Bonding Technique for Use With Capacitive Micro-Sensors," U.S. Appl. No. 13/853,886, filed Mar. 29, 2013, 30 Pages.

Loh et al., "Method for Forming a Suspended Membrane," U.S. Appl. No. 13/907,708, filed May 31, 2013, 31 Pages.

* cited by examiner

MICROELECTRONIC ENVIRONMENTAL SENSING MODULE

BACKGROUND

Technical Field

The present disclosure relates to the fabrication of microelectronic environmental sensors.

Description of the Related Art

Mobile computing devices such as smart phones typically include embedded electronic sensors such as, for example, magnetic field sensors (magnetometers) that can be used to determine orientation of the smart phone relative to the earth's ambient magnetic field. In addition, smart phones typically contain one or more accelerometers that sense the acceleration of gravity directed perpendicular to the earth's surface, and can detect movement of the smart phone. However, smart phones available today generally do not offer to consumers or program developers features that entail sensing, monitoring, or controlling local environmental conditions. Providing additional environmental sensors within smart phones, tablet computers, and the like, may encourage program developers to create applications that otherwise might not be possible.

Some existing products contain miniature environmental sensors. For example, electronic climate control devices (e.g., thermostats) rely on electronic sensors to trigger activation of furnaces and air conditioners for feedback control of air temperature and humidity. Electronic weather stations also rely on internal temperature sensors, barometric pressure sensors, and humidity sensors, such as, for example, those described in U.S. patent application Ser. No. 13/310,477 to LeNeel et al. Typically, these miniature environmental sensors are fabricated separately, on separate substrates (dies) from one another, or the sensors are built on one substrate and associated circuitry for signal processing and control is fabricated on a separate die (see, for example, US Patent Application Publication 2012/0171774A1 to Cherian et al.). Separate fabrication processes have been necessary because integrating more than one type of environmental sensor on the same substrate, with circuitry, poses a significant material processing challenge.

In some applications, chemical sensors have been integrated with circuitry for analyzing a chemical sample (see, for example, US Patent Application Publication 2012/0171713A1 to Cherian et al.). In other applications, chemical sensors can be built into a vehicle for delivering to the micro-sensor a chemical or biological sample for analysis, such as a razor blade (see, for example, US Patent Application Publication 2012/0167392A1 to Cherian et al.) In further applications, it has been possible to integrate temperature and humidity environmental sensors with the chemical sensors, for example, as disclosed in U.S. Patent Application Publications US 2012/0168882 to Cherian et al. However, in general, integration of multiple environmental sensors, including fluid sensors for measuring fluid pressure and flow rates, has been challenging because sensing elements for different environmental conditions typically require different, or even incompatible, materials. It is noted that the references cited above are owned by the applicants of the present patent application, and are hereby incorporated by reference in their entirety.

BRIEF SUMMARY

An air flow meter can be constructed using a Venturi tube in accordance with Bernoulli's principle. A Venturi tube is a device that directs fluid flow through a constriction, or nozzle. When a fluid, (e.g., a gas or a liquid), is constricted, the fluid velocity increases, and the fluid pressure drops. This fluid behavior can be observed, for example, when water flows through a garden hose nozzle. In an air flow meter, an air flow rate can be calculated from a differential air pressure based on measurements made at an open end and at the nozzle of the Venturi tube.

Miniaturization of air flow sensors can be accomplished by constructing a Venturi chamber on a semiconductor substrate, and placing microelectronic pressure sensors at the inlet and the outlet of the chamber, that is, on opposite sides of a constriction. Thus, a differential pressure can be measured, and a flow rate can be calculated. Because humidity and temperature variation are known to affect the accuracy of flow measurements using a Venturi tube, it is relevant to include additional sensors for these environmental variables as well.

The micro-sensor described herein integrates sensors for air flow, temperature, pressure, and humidity onto a single semiconductor die to provide a semiconductor-based environmental sensing module. U.S. patent application Ser. No. 13/853,732 (hereinafter "the '732 patent application"), by the applicant of the present patent application, describes an integrated sensor module that includes temperature, pressure, and humidity sensors. The microelectronic sensing module described herein incorporates the integrated sensor module of the '732 patent application into a sensor package that also includes a micro-fabricated gas flow meter. One or more such sensor packages can be used as building blocks in dedicated application-specific integrated circuits (ASICs) for use in environmental control appliances. Furthermore, the sensing module can be built on top of existing circuitry that can be used to process signals from the sensors. By integrating the Venturi tube and accompanying environmental sensors into a unitary configuration, correction factors can be obtained and applied to compensate for temporal humidity fluctuations and spatial temperature variation using the Venturi apparatus.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

FIGS. 8-10B show aspects of an integrated multi-sensor module as described herein, according to one embodiment.

DETAILED DESCRIPTION

It will be appreciated that, although specific embodiments of the present disclosure are described herein for purposes of illustration, various modifications may be made without departing from the spirit and scope of the present disclosure. Accordingly, the present disclosure is not limited except as by the appended claims.

In the following description, certain specific details are set forth in order to provide a thorough understanding of various aspects of the disclosed subject matter. However, the disclosed subject matter may be practiced without these specific details. In some instances, well-known structures and methods of semiconductor processing comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

In the following description, certain specific details are set forth in order to provide a thorough understanding of various aspects of the disclosed subject matter. However, the disclosed subject matter may be practiced without these specific details. In some instances, well-known structures and methods of semiconductor processing comprising embodiments of the subject matter disclosed herein have not been described in detail to avoid obscuring the descriptions of other aspects of the present disclosure.

Reference throughout the specification to insulating materials or semiconducting materials can include various materials other than those used to illustrate specific embodiments of the transistor devices presented. The term "environmental sensors" should not be construed narrowly to mean only sensors for pressure, temperature, and humidity, for example, but rather, the term "environmental sensors" is broadly construed to cover any type of sensor that is capable of monitoring ambient characteristics.

Reference throughout the specification to conventional thin film deposition techniques for depositing silicon nitride, silicon dioxide, metals, or similar materials include such processes as chemical vapor deposition (CVD), low-pressure chemical vapor deposition (LPCVD), metal organic chemical vapor deposition (MOCVD), plasma-enhanced chemical vapor deposition (PECVD), plasma vapor deposition (PVD), atomic layer deposition (ALD), molecular beam epitaxy (MBE), electroplating, electro-less plating, and the like. Specific embodiments are described herein with reference to examples of such processes. However, the present disclosure and the reference to certain deposition techniques should not be limited to those described. For example, in some circumstances, a description that references CVD may alternatively be done using PVD, or a description that specifies electroplating may alternatively be accomplished using electro-less plating. Furthermore, reference to conventional techniques of thin film formation may include growing a film in-situ. For example, in some embodiments, controlled growth of an oxide to a desired thickness can be achieved by exposing a silicon surface to oxygen gas or to moisture in a heated chamber.

Reference throughout the specification to conventional photolithography techniques, known in the art of semiconductor fabrication for patterning various thin films, include a spin-expose-develop process sequence involving a photoresist. Such a photolithography sequence entails spinning on the photoresist, exposing areas of the photoresist to ultra-violet light through a patterned mask, and developing away exposed (or alternatively, unexposed) areas of the photoresist, thereby transferring a positive or negative mask pattern to the photoresist. The photoresist mask can then be used to etch the mask pattern into one or more underlying films. Typically, a photoresist mask is effective if the subsequent etch is relatively shallow, because photoresist is likely to be consumed during the etch process. Otherwise, the photoresist can be used to pattern a hard mask, which in turn, can be used to pattern a thicker underlying film.

Reference throughout the specification to conventional etching techniques known in the art of semiconductor fabrication for selective removal of polysilicon, silicon nitride, silicon dioxide, metals, photoresist, polyimide, or similar materials include such processes as wet chemical etching, reactive ion (plasma) etching (RIE), washing, wet cleaning, pre-cleaning, spray cleaning, chemical-mechanical planarization (CMP) and the like. Specific embodiments are described herein with reference to examples of such processes. However, the present disclosure and the reference to certain deposition techniques should not be limited to those described. In some instances, two such techniques may be interchangeable. For example, stripping photoresist may entail immersing a sample in a wet chemical bath or, alternatively, spraying wet chemicals directly onto the sample.

Specific embodiments are described herein with reference to examples of integrated micro-sensors that have been produced; however, the present disclosure and the reference to certain materials, dimensions, and the details and ordering of processing steps are exemplary and should not be limited to those shown.

In the figures, identical reference numbers identify similar features or elements. The sizes and relative positions of the features in the figures are not necessarily drawn to scale.

Figure 1A:
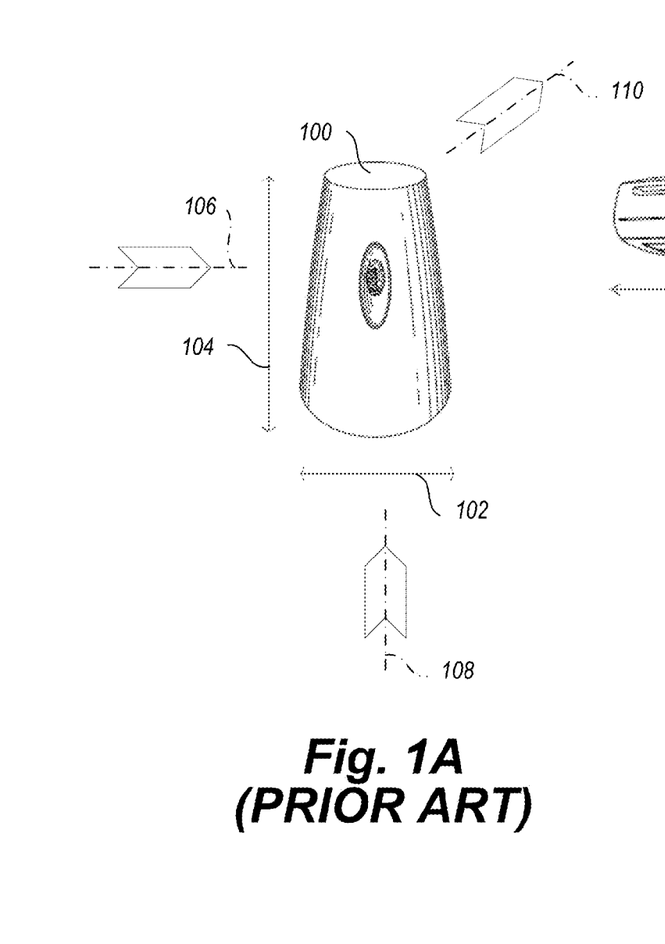
FIG. 1A is a perspective view of a prior art commercial fragrance dispenser showing air flow through the dispenser along three axes.
Figures 1B, 1C:
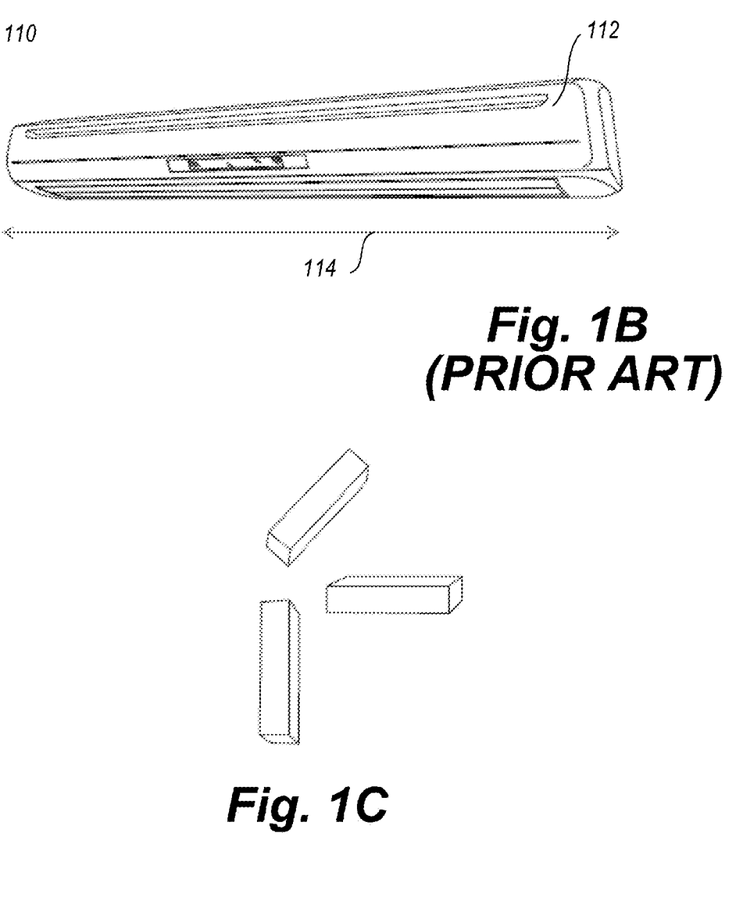
FIG. 1B is a plan view of a prior art air conditioning unit that can be equipped with a Venturi type air flow sensor.
FIG. 1C is a perspective view of an arrangement of air flow sensors consistent with embodiments described herein.

FIGS. 1A, 1B, and 1C show different types of three-axis air flow meters used in macroscopic environmental control appliances. FIG. 1A shows an example of a fragrance dispenser 100 used in a commercial aromatherapy product. A typical fragrance dispenser 100 may have a diameter 102 of about 0.1 m and a height 104 of about 0.2 m. The fragrance dispenser 100 employs an internal three-axis air flow meter wherein air enters the air flow meter, for example, along axes 106 (left) and 108 (bottom), and leaves the air flow meter along axis 110. FIG. 1B shows an exemplary conventional air conditioning unit 112 having a length 114 of about 1 meter, that also relies on an internal three-axis flow meter. FIG. 1C shows a miniaturized combination humidity, pressure, temperature, and flow sensor (HPTF) as described herein. According to one embodiment, the HPTF may be packaged so as to include six environmental micro-sensors having thin film sensing elements: two highly sensitive resistive temperature sensors, two capacitive pressure sensors, one humidity sensor, and one fluid flow sensor in the form of a Venturi chamber.

Figure 2:
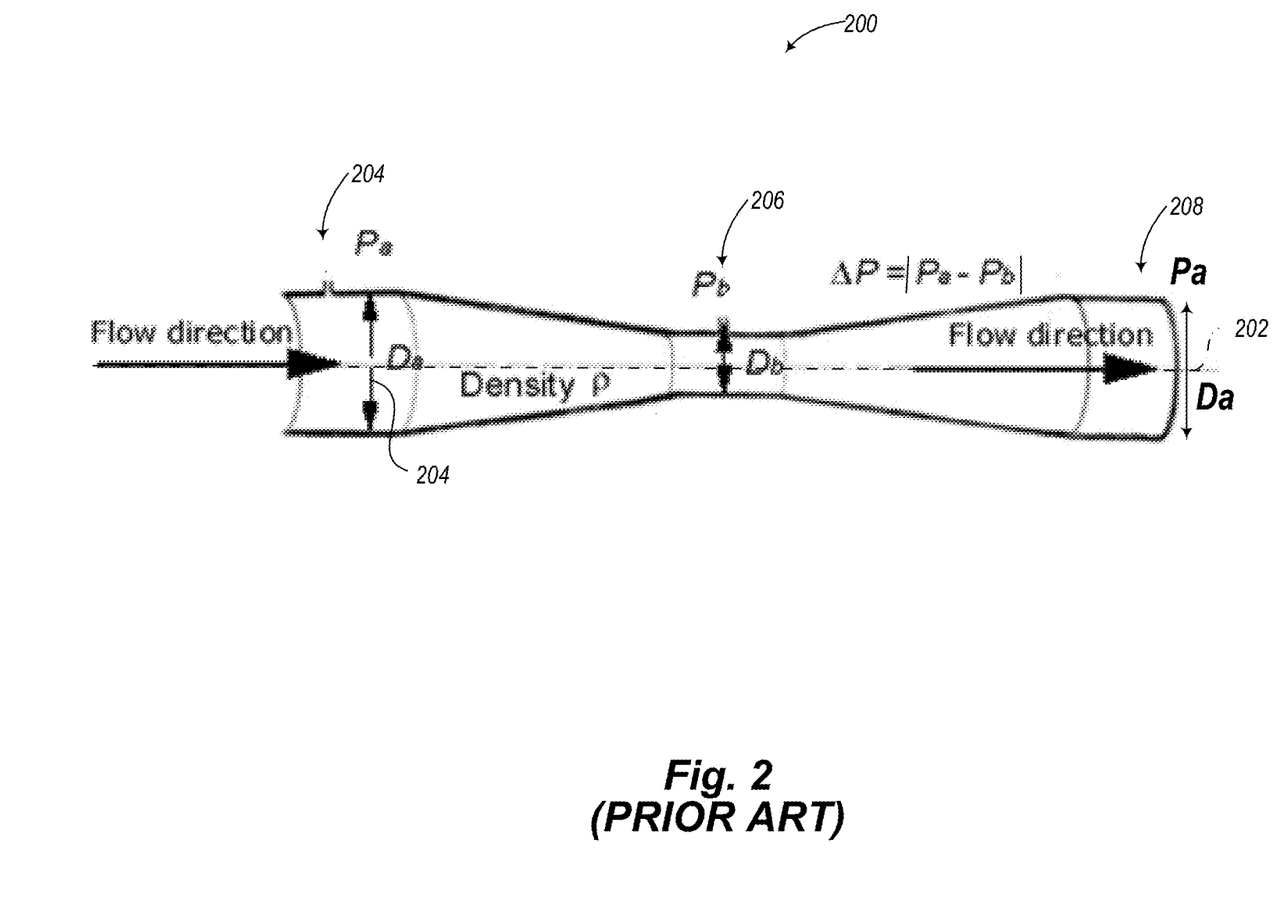
FIG. 2 is a pictorial plan view of a prior art Venturi tube.

FIG. 2 shows a conventional generic Venturi tube 200 that is designed to constrict fluid flow along an axis 202. The Venturi tube 200 has an inlet 204 of diameter $D_a$ at which fluid enters the Venturi tube 200 at a pressure $P_a$. The Venturi tube 200 further includes a constriction, or nozzle 206, of diameter $D_b$, in which the fluid pressure increases from $P_a$ to $P_b$. The Venturi tube 200, as shown, further includes an outlet 208, of diameter $D_a$ through which the fluid exits. As the fluid passes through the outlet 208, the pressure decreases back to the value $P_a$ and the flow rate increases accordingly. Two pressure sensors are thus needed to determine a differential pressure Δp which represents the increase in fluid pressure from the inlet 204 to the nozzle 206, or from the nozzle 206 to the outlet 208. Applying conservation of energy, the differential pressure, $\Delta p = |P_a - P_b|$, can be calculated from a change in kinetic energy of the fluid as it passes through the nozzle 206:

$$\Delta p = \rho/2 (v_f^2 - v_i^2), \qquad (1)$$

in which ρ is the fluid density (i.e., fluid mass per unit volume), $v_i$ is the initial fluid velocity, and $v_f$ is the final fluid velocity. Alternatively, a fluid flow rate can be calculated from a differential pressure measurement across the nozzle 206.

Figure 3:
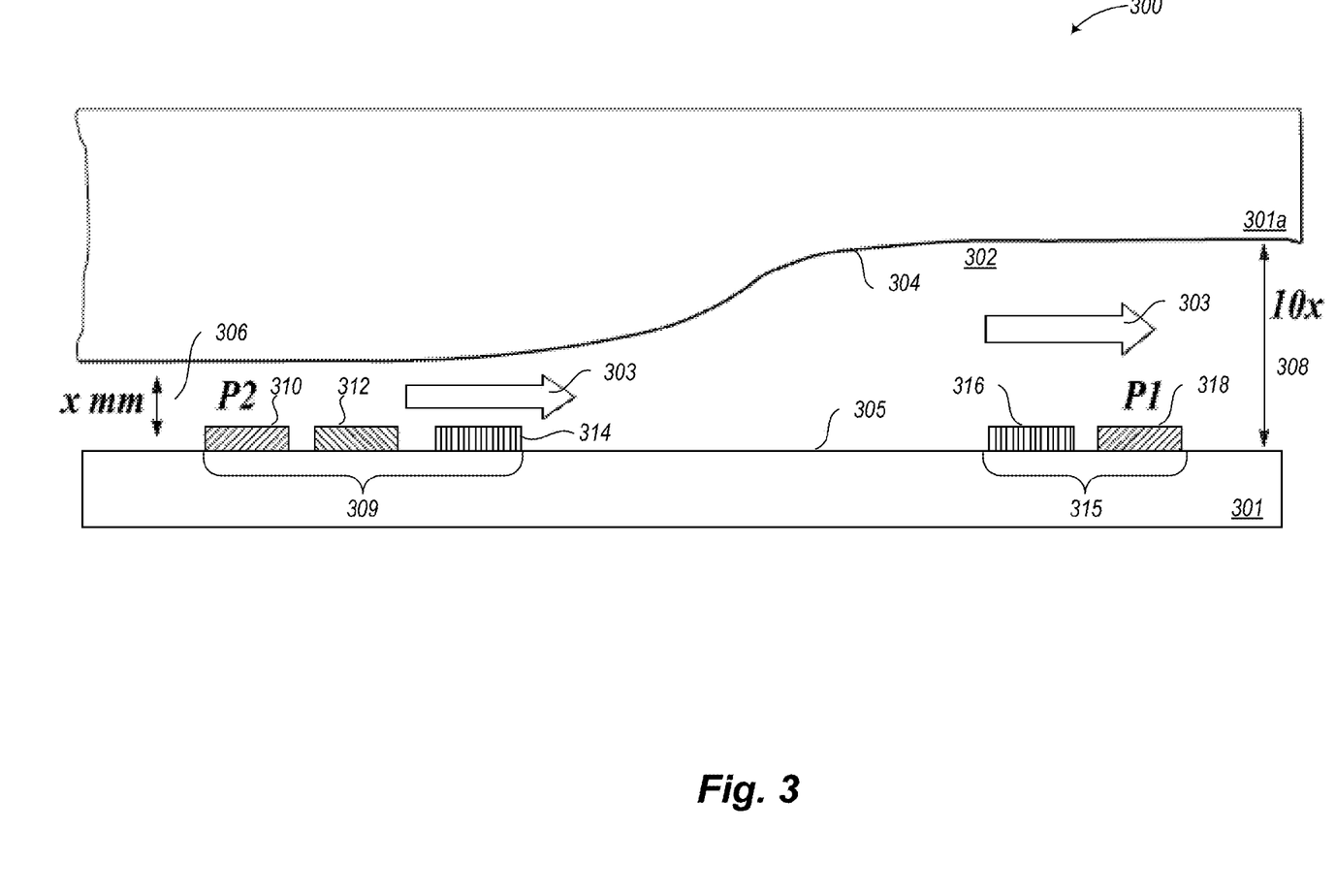
FIG. 3 is a side view of a device profile of a miniaturized Venturi chamber constructed on a semiconductor substrate and equipped with multiple environmental sensors.

FIG. 3 shows a side view of a semiconductor-based environmental sensing module 300 built on a substrate 301, for example, a silicon substrate. The environmental sensing module 300 includes a miniature Venturi chamber 302 that can be constructed as an open cavity between the substrate 301 and an attached, pre-shaped, packaging structure 301a. In one embodiment, the substrate 301 can be a non-active substrate that is made of crystalline silicon, amorphous silicon (glass), or polysilicon. Alternatively, the miniature Venturi chamber 302 can be constructed on top of active silicon devices. For example, underlying logic circuitry or interconnect circuitry can be configured to read and process sensor signals generated by the miniature Venturi chamber 302. It is generally advantageous for the substrate 301 to be thermally stable so as to act as a thermal barrier to protect the miniature Venturi chamber 302 and the multi-sensor module from heat generated by surrounding active circuitry. An insulating oxide layer can be deposited on the surface of the substrate 301, to a thickness of about 2 microns to further separate the miniature Venturi chamber 302 from the substrate 301.

The miniature Venturi chamber 302 is designed to constrict gas flow (e.g., air flow) in a transverse direction 303 indicated by arrows pointing from left to right. Although the description herein of the miniature Venturi chamber 302 refers to gas flow, the miniature Venturi chamber 302 can generally serve as a fluid flow meter for a variety of fluids, including both gases and liquids. The miniature Venturi chamber 302 has an upper substrate surface 304 and a lower substrate surface 305. Two lateral openings in the substrate 301 allow passage of a gas through the miniature Venturi chamber 302 via a gas inlet 306 of a diameter×mm, and a gas outlet 308 of a diameter that is about ten times the diameter of the inlet 306, or 10×mm.

Thus, according to the exemplary embodiment shown, the miniature Venturi chamber 302 is constricted at the gas inlet 306, forming a gas inlet nozzle. However, the miniature Venturi chamber 302 is not so limited. In alternative embodiments, the gas inlet 306 may have, instead, a large diameter relative to a constricted gas outlet 308 (nozzle) of the miniature Venturi chamber 302. Or, the shape of the miniature Venturi chamber 302 may resemble the generic Venturi tube 200, in which a nozzle is located between the gas inlet 306 and the gas outlet 308.

With reference to the exemplary embodiment shown in FIG. 3, gas can enter the miniature Venturi chamber 302 at the gas inlet 306 at a pressure $P_2$, flow in the direction 303, and exit the chamber at the gas outlet 308 at a lower pressure $P_1$. Using technology disclosed in the '732 patent application, a first integrated multi-sensor module 309 including a pressure sensor 310 to measure $P_2$, a humidity sensor 312, and a temperature sensor 314 can be mounted on the lower substrate surface 305 for continuous exposure to an ambient environment near the gas inlet 306. A second multi-sensor module 315 including a temperature sensor 316 and a pressure sensor 318 to measure $P_1$ can also be mounted on the lower substrate surface 305 for continuous exposure to an ambient environment near the gas outlet 308.

Alternatively, the humidity sensor 312 can be located near the gas outlet 308, or anywhere within the miniature Venturi chamber 302, because humidity tends to remain constant across the miniature Venturi chamber 302, whereas pressure and temperature exhibit greater spatial variation. In one embodiment, the humidity sensor 312 can be used as a calibration device, based on the fact that humidity variations cause changes in the density of air, which in turn affects pressure (and therefore flow) measurements (see J. M. Lim et al., "The Humidity Effect on Air Flow Rates in a Critical Flow Venturi Nozzle," Flow Measurement and Instrumentation, Vol 22 No. 5, October 2011, pp. 402-405).

A gas (e.g., air) flow rate can be calculated from $\Delta p = |P_2 - P_1|$, and the value of Δp can be adjusted to account for humidity and temperature effects using measured data from the sensors 312, 314, and 316. Alternatively, the sensors 310, 312, 314, 316, and 318 can be individual sensors instead of being integrated into the multi-sensor modules 309 and 315. However, the use of semiconductor-based integrated multi-sensor modules in which the sensors are co-located on a common silicon substrate is advantageous because measurements can be made in substantially the same location. Thus, for example, a temperature correction to the flow rate will tend to be more accurate when the temperature measurements are made at substantially the same location as the corresponding pressure measurements. It is noted that if the gas flow in the direction 303 remains laminar, the temperature sensors 314 and 316 are likely to remain accurate. However, if the gas flow becomes turbulent, the temperature sensors 314 and 316 may not be reliable.

Figure 4:
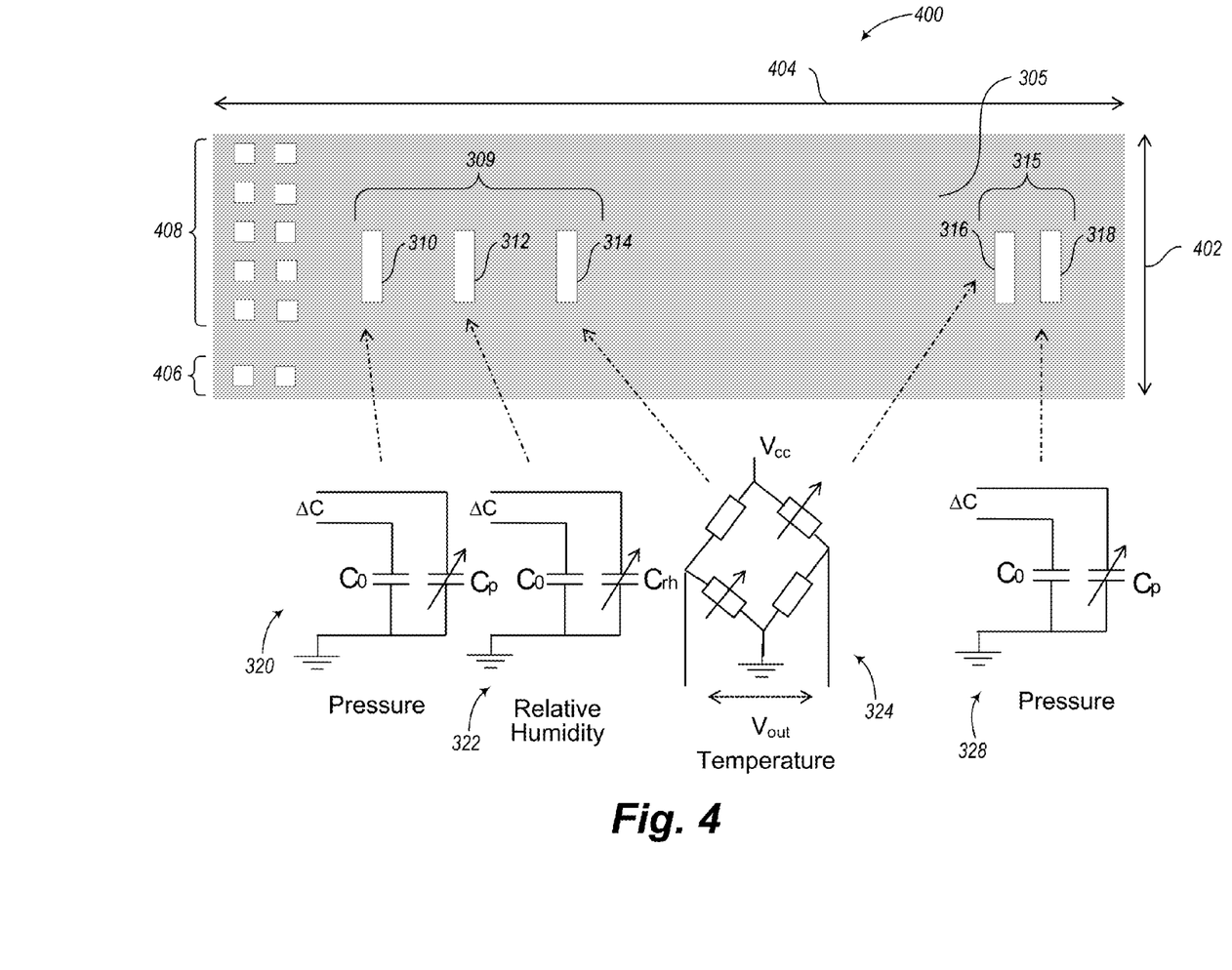
FIG. 4 is a top plan view of the miniaturized Venturi chamber and accompanying environmental sensors shown in FIG. 3, including schematics of each of the sensors.

FIG. 4 shows an exemplary top down view 400 from within the miniature Venturi chamber 302 of the environmental sensing module 300 shown in cross-section in FIG. 3. In one embodiment, the lower substrate surface 305 as seen from above, has a substrate width 402 of about 1 cm and a substrate length 404 of about 2 cm. Also shown from a top-down view are the pressure sensor 310, the humidity sensor 312, the temperature sensors 314, 316, and the pressure sensor 318. The temperature sensors 314, 316 are desirably made from an active material that has a high thermal coefficient of resistance (TCR) to allow a highly sensitive voltage response to changes in ambient temperature. At the left end of FIG. 4 is shown a pair of power pads 406, and an array of output connection pads 408. The power pads 406 provide a path for supplying common power and ground signals to the various sensors through the integrated multi-sensor modules 309 and 315. Alternatively, power pads 406 can supply power and ground signals to individual sensors if needed. The output connection pads 408 are configured to receive interconnect circuitry to access sensor output voltages and currents for data collection.

Below each of the sensors 310, 312, 314, 316, 318 is shown an exemplary schematic that embodies the sensor. For example, the pressure sensor 310 can be built according to a first differential capacitor schematic 320; the humidity sensor 312 can be built according to a second differential capacitor schematic 322; the temperature sensors 314, 316, can be realized as a thin film Wheatstone bridge in accordance with a Wheatstone bridge schematic 324; and the pressure sensor 318 can be built according to a third differential capacitor schematic 328. Each of the sensors is described in further detail in the '732 patent application.

With reference to FIG. 2, the sensors 310, 312, 314, 316, and 318 allow for correcting calculated values of air flow by modifying equation (1) above to yield Darcy's equation:

$$\Delta p = P_2 - P_1 = 4 \, fL/dg(v^2), \quad (2)$$

in which L is the length of the Venturi tube, d is the diameter of the Venturi tube, g is the acceleration of gravity, f is a friction factor, and v is the fluid velocity. In particular, the friction factor f varies with the relative humidity of the air.

Figure 5:
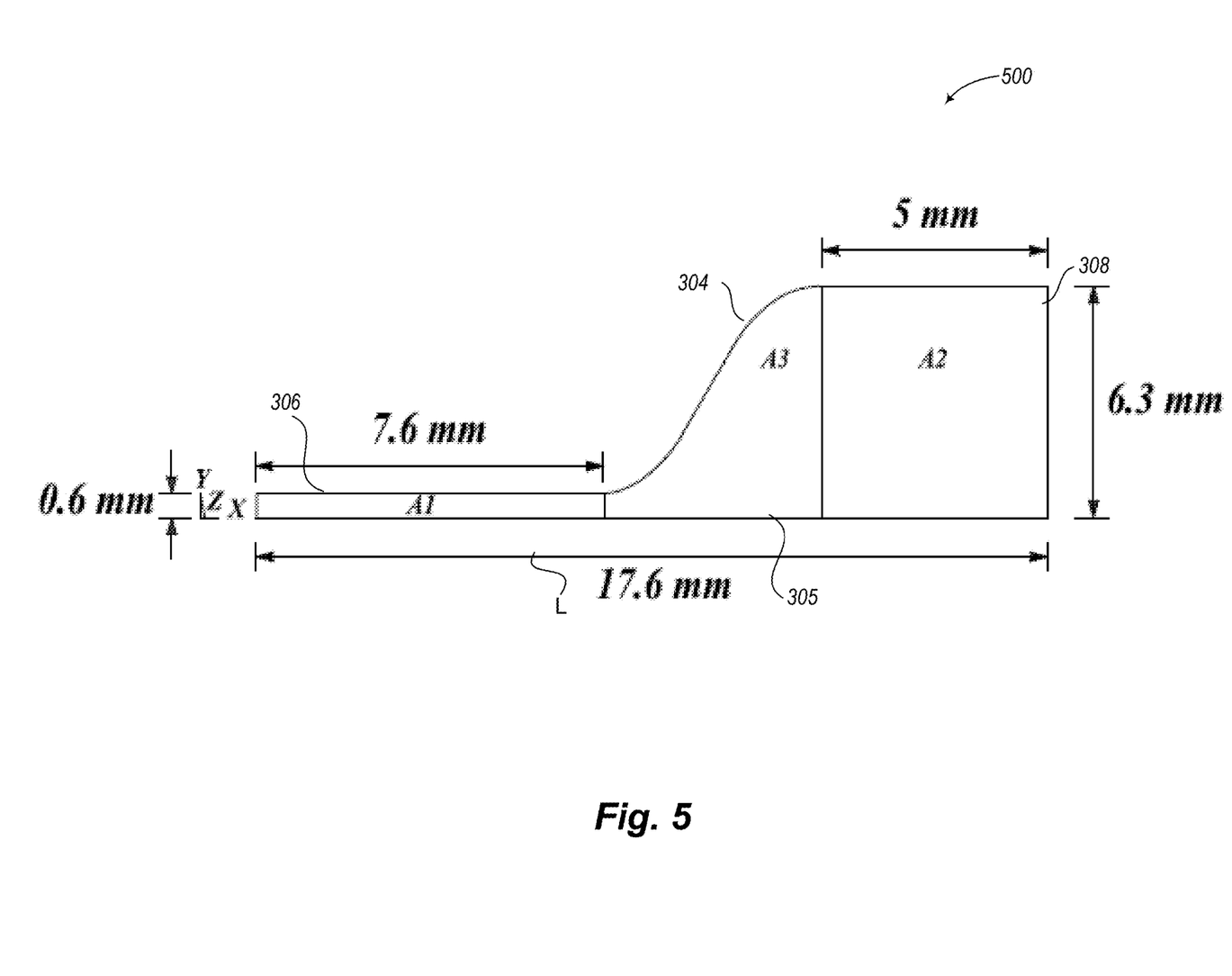
FIGS. 5-7 show aspects of a finite element numerical simulation of air flow through a Venturi tube model of the miniature Venturi chamber shown in FIG. 3.
Figure 6:
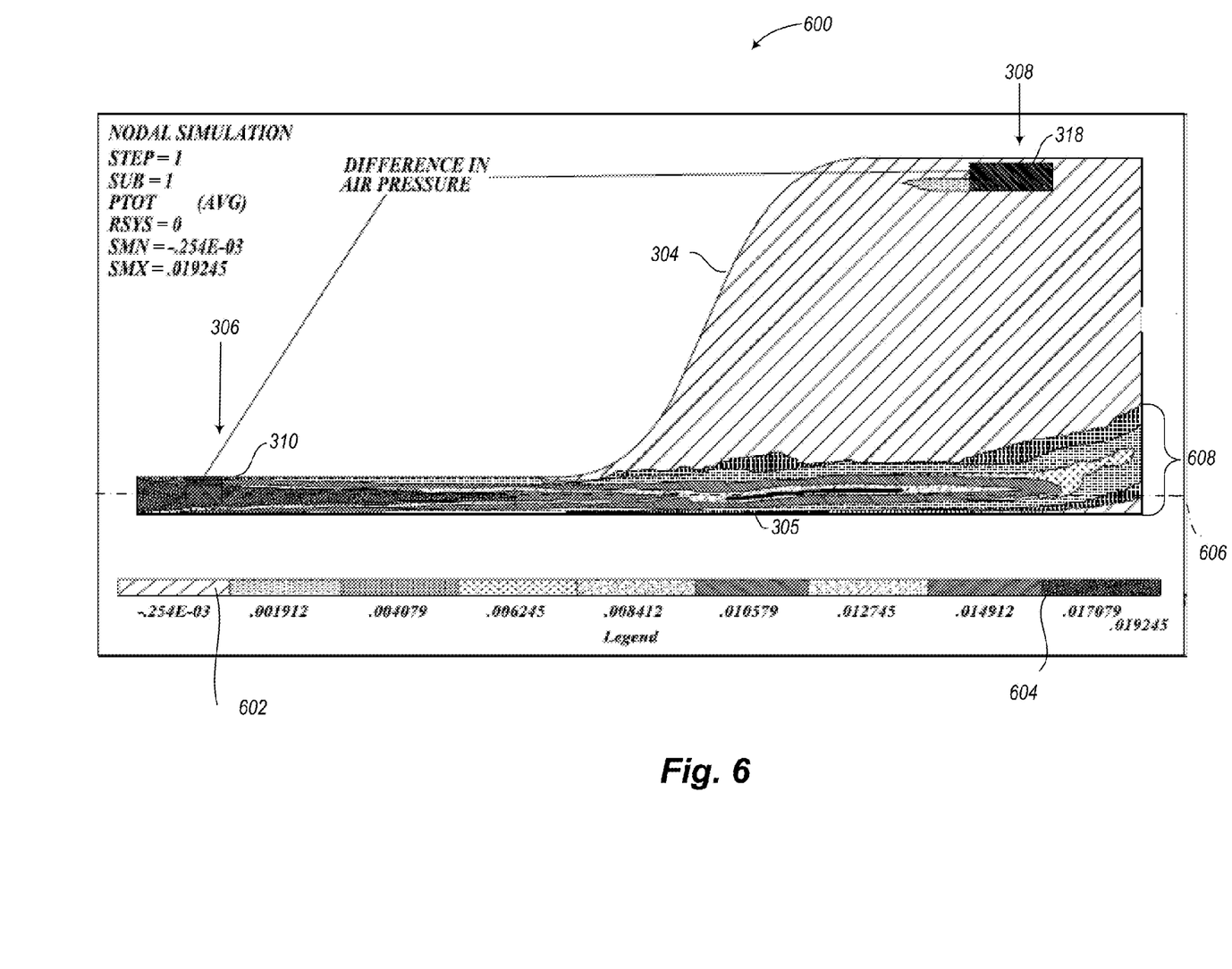
Figure 7:
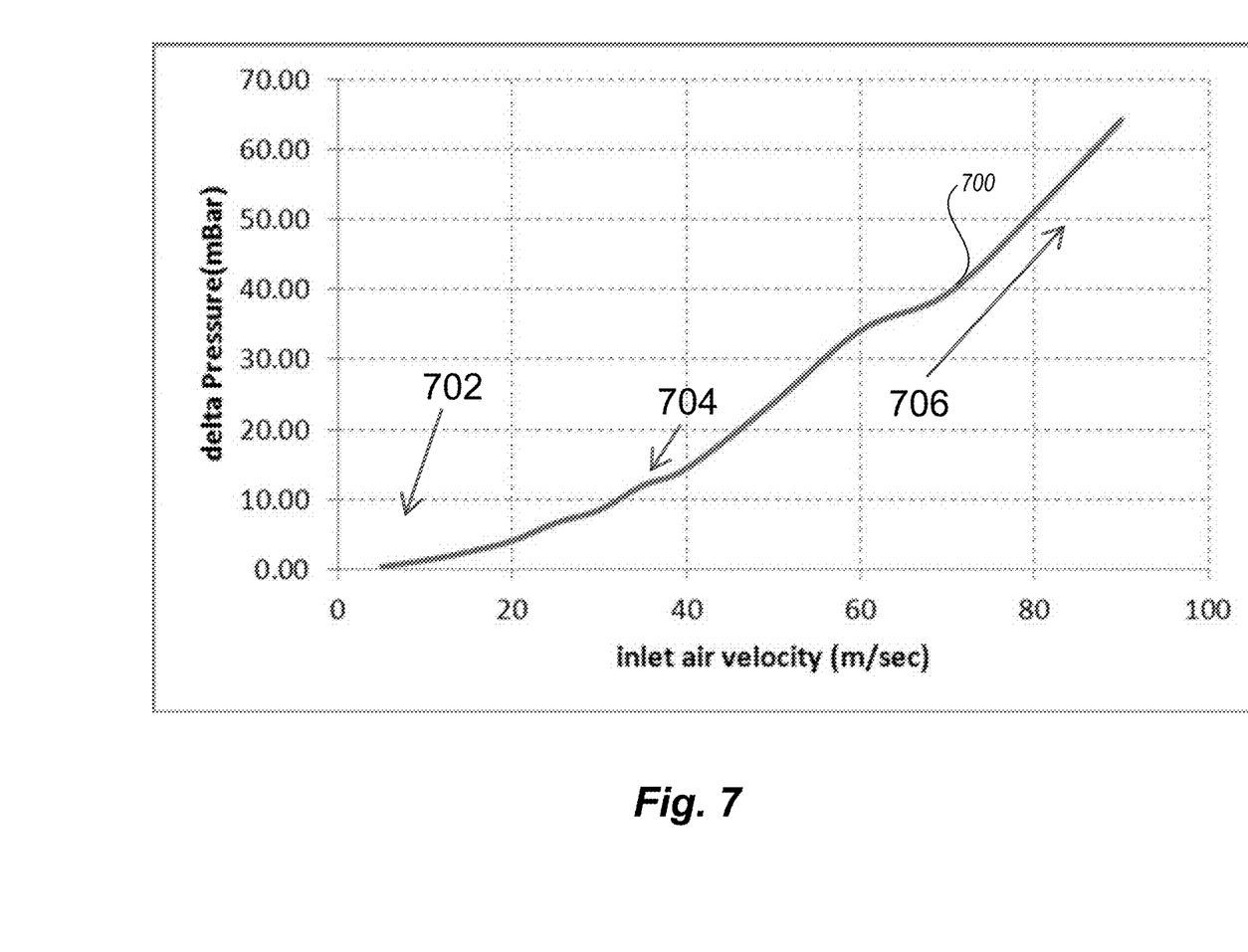

FIGS. 5, 6, and 7 describe a finite element simulation of an exemplary Venturi tube model 500 of the miniature Venturi chamber 302 shown in FIG. 3 (i.e., half of the full Venturi tube 200 shown in FIG. 2). FIG. 5 shows the geometry of the Venturi tube model 500 as seen from a side view. In the embodiment shown, the constricted diameter, ×, of the Venturi tube model 500 at the inlet 306 is about 0.6 mm and the diameter of the open portion of the Venturi tube model 500 at the outlet 308 is about 10 times 0.6 mm or 6.3 mm. The total length of the tube, L, is 17.6 mm. The length of the constricted region A1 is 7.6 mm; the length of the open portion of the tube A2, at the outlet 308, is 5.0 mm. A throat region of the tube, A3, is designated between the inlet 306 and the outlet 308.

FIG. 6 shows a temporal snapshot 600 taken during a finite element ("nodal") simulation run in which operation of the miniature Venturi chamber 302 is simulated using the geometry of the Venturi tube model 500. At the time of the snapshot, air speed at the gas inlet 306 of the Venturi tube model 500 is non-zero, and a pressure difference is therefore evident between the gas inlet 306 and the gas outlet 308. This pressure difference corresponds to a measurable pressure difference that can be sensed in the miniature Venturi chamber 302 by the pressure sensors 310 and 318. The snapshot 600 shows a two-dimensional pressure map in which regions of high pressure are indicated by a dark pattern 602, and regions of low pressure are indicated by an open striped pattern 604. Thus, the wide open gas outlet 308 is at a low pressure (−0.254E-03), effectively zero mBarr, and the constricted gas inlet 306 is at a maximum pressure of about 20 mBarr, or 0.019 Barr. In the snapshot shown, air moves along an axis 606 of the chamber and has not yet dissipated throughout the low pressure region of the gas outlet 308, although some diffusion is evident at the far right end 608 of the outlet 308.

FIG. 7 shows a curve 700 of the pressure difference Δp in mBarr as a function of the initial air velocity $v_i$ at the inlet 306, in m/s. According to equation (2) above, the pressure difference varies with the square of the velocity, so the shape of the curve 700 should resemble a parabola. The low-velocity region 702 of the curve 700 corresponds to air flow like that inside a typical room. The medium-velocity region 704 of the curve 700 corresponds to air flow like that outside on a windy day. The high-velocity region 706 of the curve 700 corresponds to air flow like that outside during a wind storm. The change in pressure between the constricted inlet 306 and the open outlet 308 rises from zero mBarr to about 65 mBarr as the air speed at the inlet 306 increases. For example, if the wind speed is zero (still air), there is no discernible pressure drop across the chamber. As the wind speed increases to 80 m/sec, the pressure drop across the Venturi tube increases to about 50 mBarr.

FIGS. 8-10B show aspects of the exemplary integrated multi-sensor module 309, as disclosed in the '732 patent application.

Figure 8:
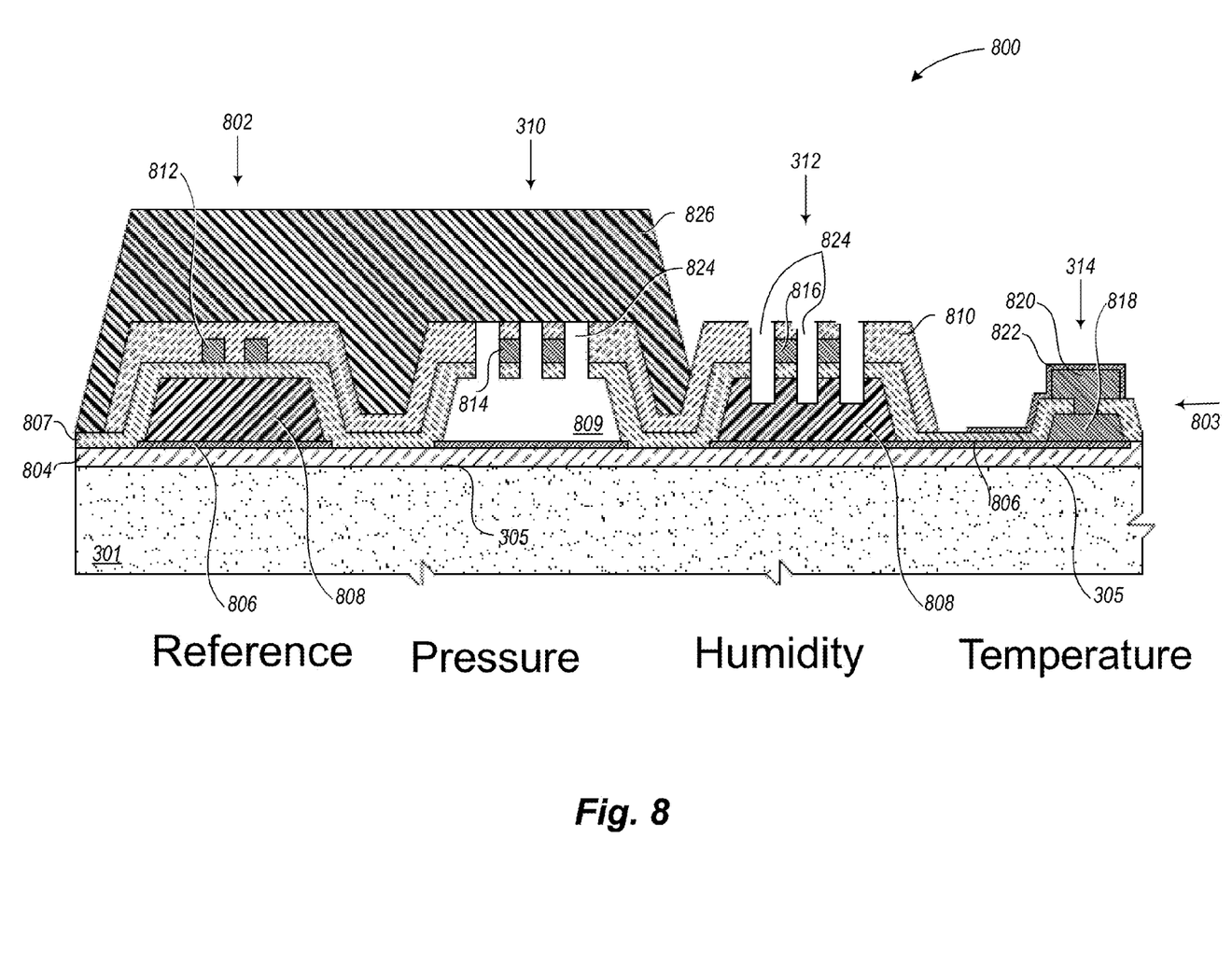

The module profile 800 can be fabricated on, for example, the lower substrate surface 305 of the substrate 301. In addition to the pressure sensor 310, the relative humidity sensor 312, and the temperature sensor 314, the module profile 800 further includes a reference pressure sensor 802. Each environmental sensor includes one or more thin film sensing elements designed to be highly sensitive to environmental conditions. The pressure sensor 310 is designed to be accurate to within about ±1 mBarr; the relative humidity sensor 312 is designed to be accurate to within about ±3%; and the temperature sensor 314 is designed to be accurate to within about ±1 degree. Choice of materials for the various structures shown in FIG. 3 can determine the degree of success of integrating the various sensors onto a common substrate.

In the embodiment shown in profile in FIG. 8, an active environmental sensor layer 803 is shown constructed on top of an insulating oxide layer 804 that separates the active environmental sensor layer 803 from the substrate 301. Differential capacitor elements within the active environmental sensor layer 803 include a common bottom plate 806; one or more capacitive dielectrics 807, 808, 809, and 810; and metal mesh top plates 812, 814, and 816. Resistive temperature sensors such as the temperature sensor 314 include the common bottom plate 806, the dielectric 807, a second metal layer 818, a third metal layer 820, and a metal cap layer 822. The common bottom plate 806 may further be used as a heater to calibrate and/or adjust the various sensors according to a calibration protocol as described in the '732 patent application. The pressure and humidity sensors 310 and 312, respectively, are exposed to the ambient environment through openings 824. A thick, polyimide protective layer 826 covers the pressure sensor 310 and the reference pressure sensor 802.

Figure 9:
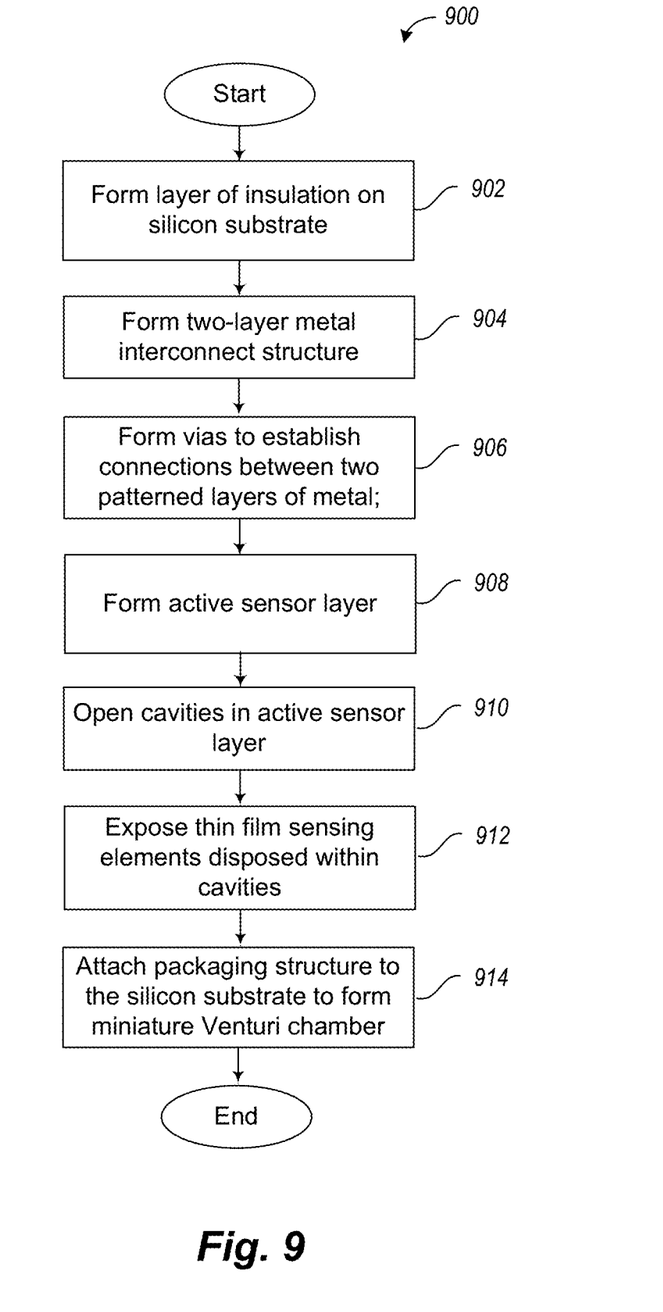

FIG. 9 summarizes an exemplary sequence of process steps in a method 900 of fabricating the integrated multi-sensor module 309 described below with reference to the module profile 800 shown in FIG. 8. At 902, the insulating oxide layer 804 can be formed on the silicon substrate 301. The insulating oxide layer 804 can be deposited to a thickness of about 2 microns to further separate the multi-sensor module 309 from the substrate 301.

At 904, a two-layer metal interconnect structure including the second metal layer 818 and the third metal layer 820 can be formed. According to one embodiment, the common bottom plate 806 is shown as being incorporated into each of the capacitive and resistive sensors, but the metal layers 818 and 820 are only shown as being incorporated into the (resistive) temperature sensor 314.

At 906, vias are formed in the dielectric 807 to permit connections between the common bottom plate 806 and the third metal layer 820. The common bottom plate 806 is desirably made of a refractory metal having a low thermal coefficient of resistance (TCR) such as tantalum aluminum (TaAl), titanium (Ti), or tungsten silicon nitride (WSiN) that can sustain temperatures of several hundred to several thousand degrees Celsius, and that exhibits a medium sheet resistance.

At 908, the active sensor layer 803 is formed. Disposed between the metal mesh top plates 812, 814, 816 and the common bottom plate 806, for each parallel plate capacitor sensor, is the capacitive dielectric film 808 that is sensitive to ambient environmental conditions. A purpose of the metal mesh top plates 812, 814, 816 is to provide continuous exposure of the capacitive dielectric films to the same ambient environment through 1-2 µm wide openings 824 in the mesh. When the capacitive dielectric film 808 is exposed to the environment, pressure on the capacitive dielectric film 808 decreases the film thickness, thereby changing the capacitance of the sensor device. Similarly, changes in ambient humidity can cause the capacitive dielectric film 808 to expand or contract, thereby changing the film thickness, and in turn the capacitance of the sensor.

The desired material for the capacitive dielectric film 808 in the example shown is a 1-4 um thick layer of polyimide for both the humidity sensor 312 and the reference pressure sensor 802. It is generally advantageous to use a thin capacitive dielectric film 808 (e.g., 1 µm) to reduce topography, thus producing a smoother surface.

At 910, cavities are opened in the active sensor layer 803. The desired material for the capacitive dielectric used in the pressure sensor 310 as shown is air (i.e., the dielectric is formed as a cavity 809 that can be filled by the passage of ambient air through the openings 824 in the mesh top plate 814). Between each capacitive dielectric film 808 and metal mesh top plate there can be formed a second dielectric layer 807 of, for example, about 0.5 µm of silicon nitride ($Si_3N_4$) or silicon carbide (SiC), to provide thermal transmission so as to readily dissipate heat. The metal mesh top plates 812, 814, 816 can be made of aluminum, or another suitable metal. Surrounding the metal mesh top plates there can be deposited a third dielectric passivation layer 810 of, for example, 0.5 µm-thick silicon nitride ($Si_3N_4$). In accordance with the embodiment shown, the dielectric/metal/passivation total stack height in the embodiment shown is about 1 µm. The width of the second and third (passivation) dielectrics between the metal mesh top plates and the neighboring openings 824 shown is also about 1 µm.

The temperature sensor 314 within the integrated multi-sensor module 309 includes exemplary multi-layer resistive elements, one of which is shown in cross section at the far right of FIG. 8. Each resistive element can be made up of layers that can include the common bottom plate 806, a second metal layer 818, the second dielectric layer 807, and the third metal layer 820. The second metal layer 818 can be made of, for example, AlCu. The third metal layer 820 can be made of, for example, aluminum that can be capped with a thin, high TCR metal such as a platinum (Pt) metal cap layer 822 of about 100 Å. Alternatively, the metal cap layer 822 can be made of a chromium silicon (CrSi) material, which also has a high TCR.

At 914, after the capacitive sensors 310, 312, and 802 are formed, the thin film sensing elements 808 and 809 can be exposed to ambient conditions by forming openings 824 in the dielectric layers 807 and 810.

Next, the thick protective layer 826, shown in FIG. 8 as a polyimide film having a thickness of about 6 µm, can be spun on at room temperature to cover portions of the reference pressure sensor 802 and the pressure sensor 310. An optional silicon nitride (SiN) cap can be deposited to shield the photo-sensitive polyimide protective layer 810 from exposure to light.

At 914, the packaging structure 301a can be attached to the silicon substrate 301 to form the mini-Venturi chamber 302 around the multi-sensor module 309.

Figure 10A:
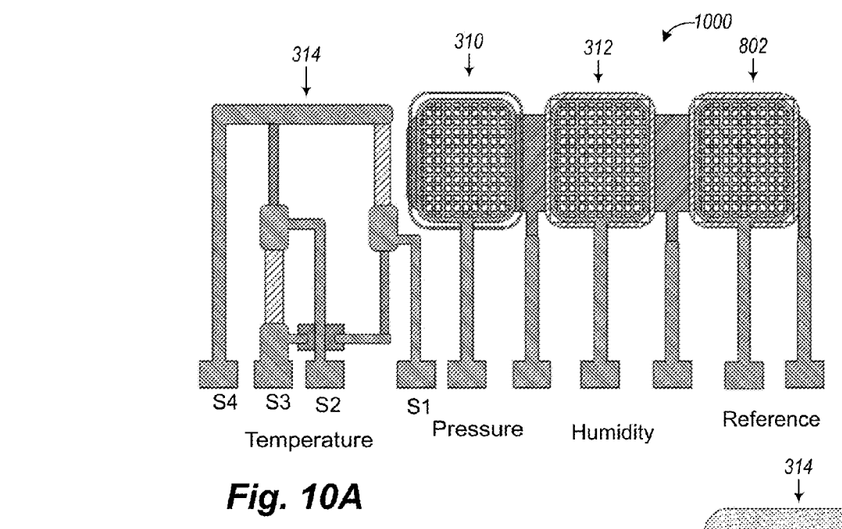

FIG. 10A shows a top-down view of an integrated multi-sensor module 1000 having a configuration similar to the integrated multi-sensor module 800 shown in cross-section in FIG. 8, except that the positions of the relative humidity sensor 312 and the pressure sensor 310 have been swapped.

Figure 10B:
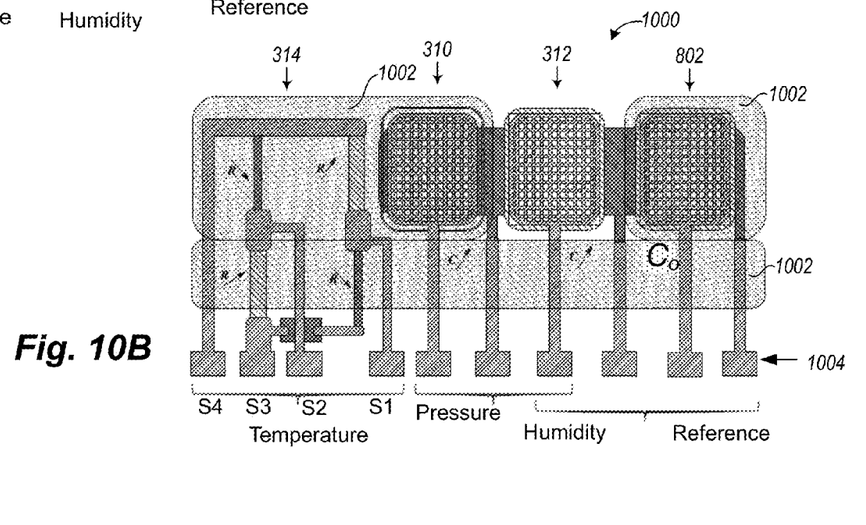

FIG. 10B shows the integrated multi-sensor module 900, over which a patterned passivation layer 902 has been added. In this example, the patterned passivation layer 902 exposes the relative humidity sensor 312 so as to allow the dielectric membrane of the relative humidity sensor 312 ample exposure to ambient moisture variation. The reference pressure sensor 902, is underneath the patterned passivation layer 902. The patterned passivation layer 902 also exposes a row of electrical contact pads 904 so that signals are accessible to be read from one or more of the sensors. The patterned passivation layer 902 can be made of a standard passivation material such as polyimide, for example, or silicon nitride.

Figure 11A:
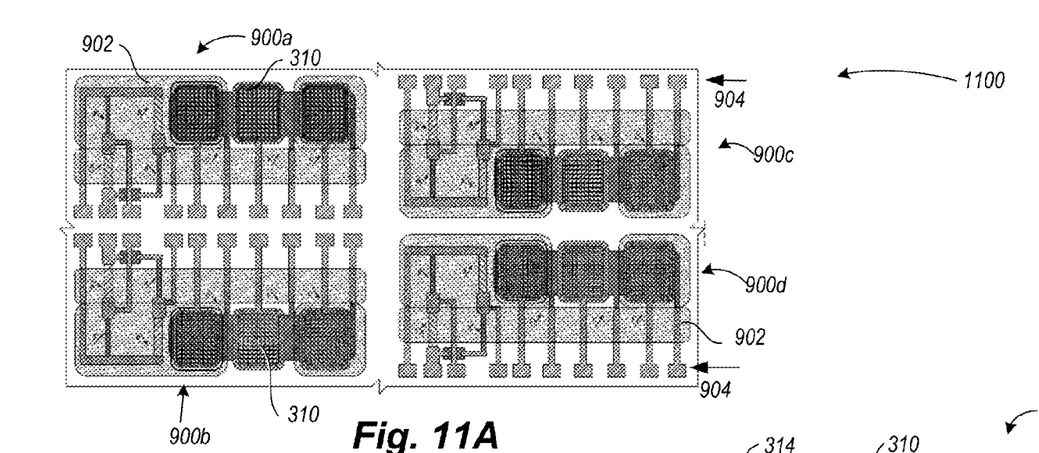
FIG. 11A is a plan view of an ASIC layout of four of the multi-sensor modules shown in FIG. 10B.

FIG. 11A shows an exemplary ASIC sensor module layout 1100 that includes four passivated multi-sensor modules 900a-900d (collectively 900). Each multi-sensor module 900 is covered by the added passivation layer 902 as shown in FIG. 9B. The two passivated multi-sensor modules on the left, 900a and 900b, are in a mirror-image configuration, as are the two passivated multi-sensor modules 900c and 900d on the right. Such a configuration results in greater structural stability after a silicon cap is attached as described below.

Figure 11B:
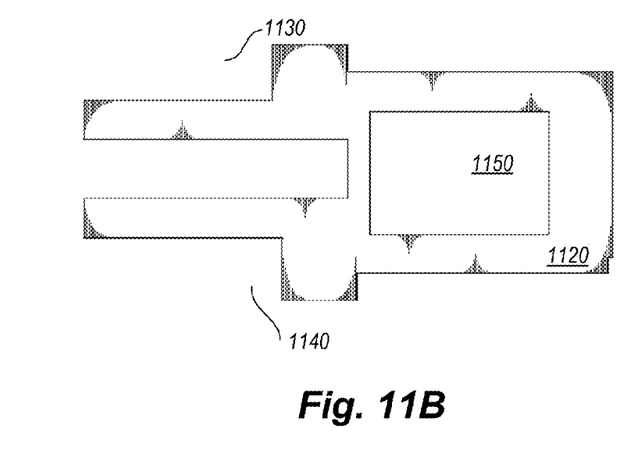
FIG. 11B is a plan view of a patterned silicon cap as described herein.

FIG. 11B shows a patterned silicon cap 1120 for attachment to the ASIC sensor module layout 1100. The patterned silicon cap 1120 is a silicon wafer, about 300 microns thick, configured with openings 1130, 1140, 1150 that align with the humidity sensors 312. The patterned silicon cap 1120 can be adhesively bonded to the layout 1100 to form a laminate that protects portions of each multi-sensor module 900 while allowing contact between the sensor membranes and the ambient environment (e.g., air). The bonding process is desirably carried out at a low temperature. In other embodiments, depending on the application, the openings may align with different sensors, for example, with the humidity sensors 312 so that the reference pressure sensors 802 can be sealed under the silicon cap 1120.

Figure 11C:
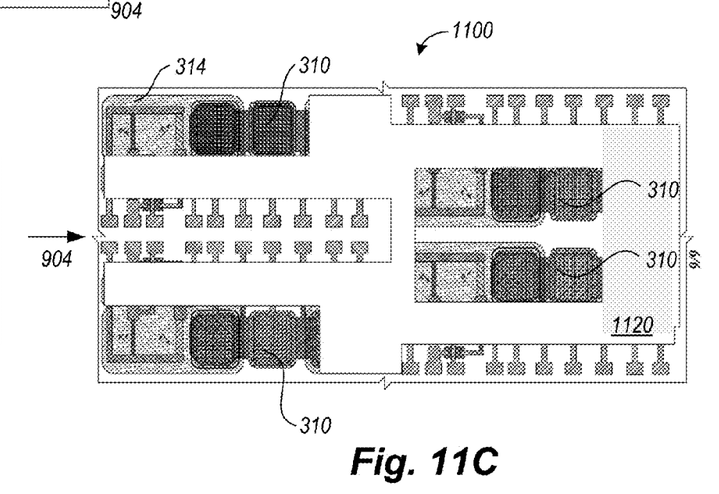
FIG. 11C is a plan view of the patterned silicon cap shown in FIG. 11B, following adhesive bonding to the four multi-sensor modules shown in FIG. 11A.

FIG. 11C shows the silicon cap 1120 attached to the ASIC sensor module layout 1100. The silicon caps 1120 do not cover the temperature sensors 314, the pressure sensors, the humidity sensors 310, or the rows of electrical contact pads 904. Only the reference pressure sensors are covered. Because the openings 1130, 1140, and 1150 are needed for sensing ambient environmental conditions, the final product is essentially environmentally unprotected. However, deployment of a multi-sensor module within a Venturi chamber as described herein provides additional protection so that the silicon cap 1120 itself may be considered an optional element of such an embodiment.

Figure 12:
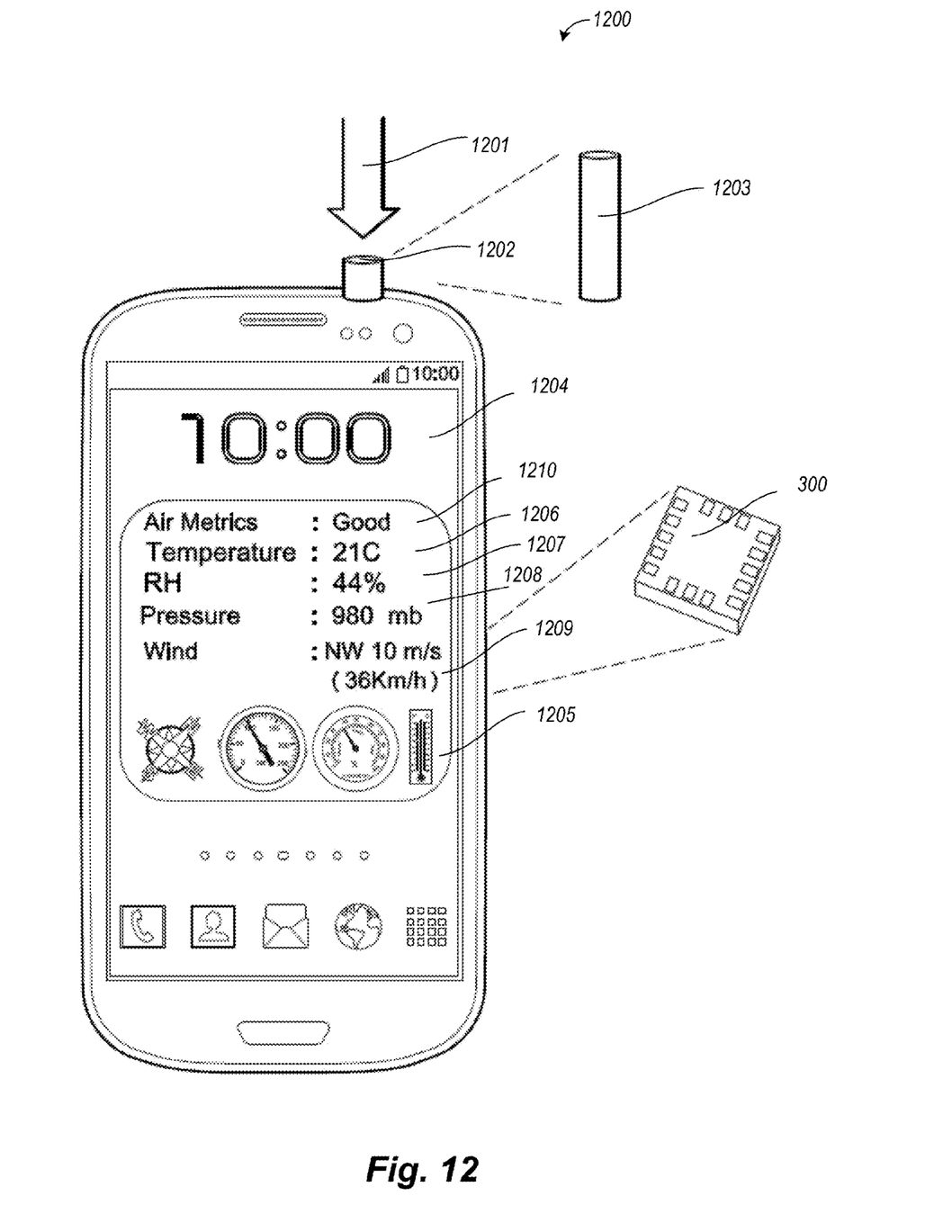
FIG. 12 is a screen shot of a smart phone running a weather station application that displays data from an on-board miniature multi-sensor module that includes an air flow meter.

FIG. 12 shows a smart phone 1200 equipped with a semiconductor-based multi-sensor module 300 that can be used to monitor ambient environmental conditions in real time, including wind speed. A small die size and low power consumption make the multi-sensor module 300 especially suited for mobile computing applications.

A shell of the smart phone 1200 can be modified so as to allow exposure of the capacitive sensors and the air flow sensor to ambient air flow 1201. In particular, the smart phone shell can be modified to accommodate the internal air flow meter by including an air entry aperture 1202 in the shell to expose the on-board venturi sensor 1203 to the ambient air flow 1201. An exemplary smart phone application ("app") can, for example, be programmed to display on the smart phone screen 1204 weather station icons 1205. The smart phone app can report measurements of temperature, relative humidity, pressure, and wind speed and direction via the readouts 1206, 1207, and 1208, and 1209, respectively. The smart phone app can further provide an assessment of air quality 1210 based on a comparison of the measurements to a selected standard. The standard can be pre-programmed or set by a user of the smart phone, for example.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An application-specific integrated circuit (ASIC), comprising:
   a semiconductor substrate;
   an integrated environmental sensing module that includes:
   a pre-shaped packaging structure attached to the semiconductor substrate;
   a Venturi flow chamber formed between the substrate and the pre-shaped packaging structure; and
   a plurality of environmental micro-sensors on the semiconductor substrate and within the Venturi flow chamber; and
   a protective silicon cap on the integrated environmental sensing module, wherein a continuous exposure of the integrated environmental sensing module to a same ambient environment is provided by a sensor window in the silicon cap.

2. The ASIC of claim 1 wherein the Venturi flow chamber has a gas inlet and a gas outlet, and the environmental micro-sensors include:
   a capacitive relative humidity sensor;
   a first resistive temperature sensor and a first capacitive pressure sensor, positioned for continuous exposure to an ambient environment near the gas inlet; and
   a second temperature sensor and a second pressure sensor positioned for continuous exposure to the ambient environment near the gas outlet.

3. The ASIC of claim 1 wherein the integrated environmental sensing module further comprises interconnect circuitry to extract signals from the micro-sensors.

4. The ASIC of claim 1 wherein the gas inlet is constricted.

5. The ASIC of claim 1 wherein the silicon cap is a patterned silicon wafer adhesively bonded to the integrated environmental sensing module.

6. The ASIC of claim 1 wherein the silicon cap includes at least one opening through which electrical connections can be made to the integrated environmental sensing module.

7. The ASIC of claim 1, further comprising logic circuitry in the substrate, the logic circuitry configured to read and process signals generated within the integrated environmental sensing module.

* * * * *